Nov. 17, 1942.  M. C. BROOKS  2,302,416
HEAT EXCHANGE UNIT AND HEATING SYSTEM FOR AUTOMOBILES
Filed Feb. 24, 1938  2 Sheets-Sheet 1
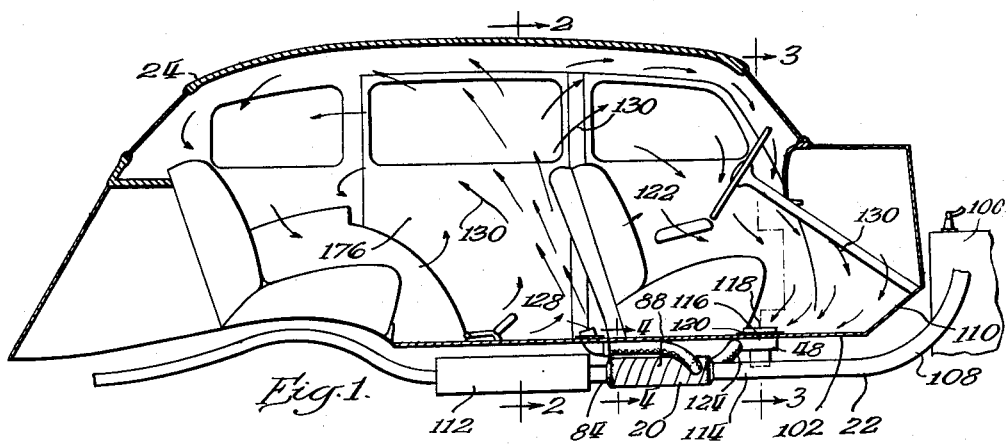
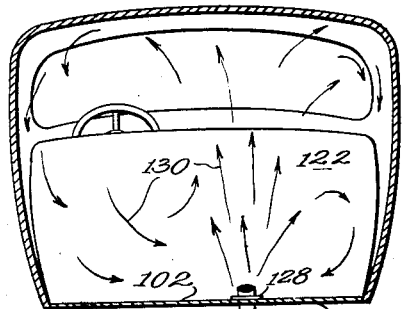
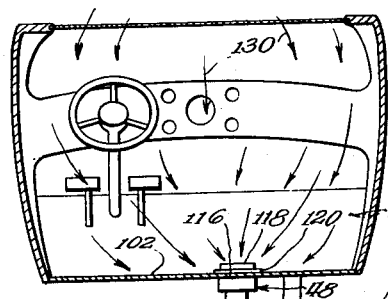
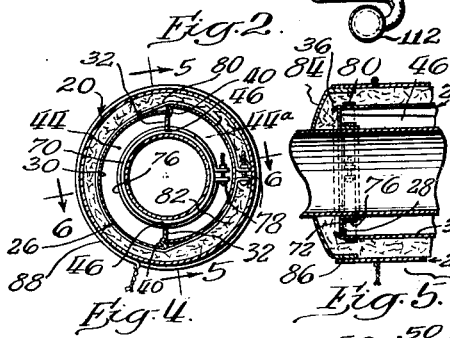
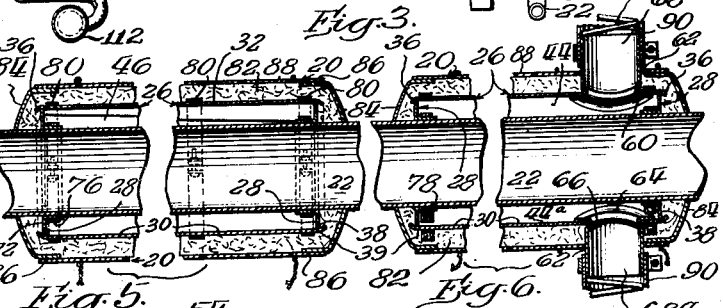
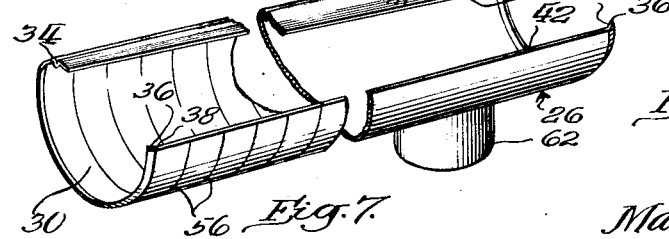
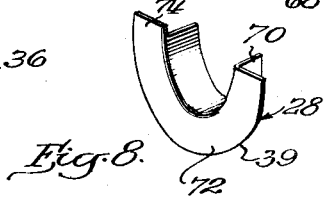
Inventor
Marvin C. Brooks
By
Williams, Bradbury, McCabe & Hinkle
Attys Nov. 17, 1942.  M. C. BROOKS  2,302,416
HEAT EXCHANGE UNIT AND HEATING SYSTEM FOR AUTOMOBILES
Filed Feb. 24, 1938  2 Sheets-Sheet 2

Inventor
Marvin C. Brooks
By Williams, Bradbury, McCaleb & Hinkle
Attys

Patented Nov. 17, 1942

2,302,416

UNITED STATES PATENT OFFICE 2,302,416

HEAT EXCHANGE UNIT AND HEATING SYSTEM FOR AUTOMOBILES

Marvin C. Brooks, Chicago, Ill., assignor to Albert G. McCaleb, Evanston, Ill.

Application February 24, 1938, Serial No. 192,263

17 Claims. (Cl. 237—12.3)

The invention relates to heating devices and more particularly to an improved heat exchange unit and heating system for automobiles.

In the conventional heater systems for the passenger compartments of motor vehicles, the current of heated air is expelled from the heater unit into the compartment directly against the passengers, generally towards their feet, and, although at the time the heater is turned on, the sensation of the direct contact with the highly heated air is a pleasant one, it is not long until the heater has to be turned down or off because it becomes uncomfortable.

This feeling of excessive heat, which comes after the heater has been on for some time, is a sensation which is one primarily of the senses rather than one existing in fact and is influenced greatly by several factors which have been neglected heretofore when installing the heater units in the automobiles.

One of these factors relates to stagnation of air which arises out of the structural characteristics of sedans and closed body types which have become the prevalent style of the automobile bodies manufactured at the present time. The front seat generally provides an impervious partition extending upwardly approximately two-thirds the height of the body between the front part and the rear part of the passenger compartment and the heater unit is usually installed on the dash behind the instrument panel. With the front seat providing such an obstruction, it is practically impossible to obtain appreciable circulation of the air throughout the compartment. Moreover, in the instances where heat outlets are provided for the front and rear parts of the compartment, the outlets are located on the floor and expel the air upwardly simultaneously. In either case a body or strata of comparatively stagnant warm air convectively collects at the top of the car around the heads and shoulders of the occupants proximate the level of the windows.

This gives rise to two results: First, the air in the compartment, lacking motion, feels stagnant, stuffy and depressing because the vitiated air near the bodies of the passengers is not being replaced, notwithstanding the fact that all the other qualities of the air may be favorable or satisfactory; and second, the stagnation of the warm air at the top of the compartment creates a wide actual temperature differential between the heads and feet of the passengers. This last result is related to the effective temperature for the passengers, which may be defined as the point of transition between a feeling of warmth and cold by a person in response to temperature, humidity and air movement as determined by exposed skin surfaces. Consequently, since the face and hands are the only skin surfaces exposed, the upper limit of the effective temperature of the passengers is determined by the factors present in the stagnant warm strata. This leaves the lower extremities of the passengers in a cold lower strata of air, once the heater is turned down or off. If the heater were left on for a sufficient length of time to carry the temperature of the lower strata high enough to keep the feet warm, the corresponding boost of temperature, for the upper stagnant strata, would induce drowsiness and undue perspiration.

Another factor influencing the comfort of the passengers relates to humidity. In view of the fact that absolute humidity is directly proportional to the temperature of the air, the cold wintry air present in the car will usually have a very low relative humidity after it has been heated. In fact, the relative vapor content is much too low to satisfy comfort requirements. The relative humidity should be not less than thirty per cent., and not more than sixty per cent., with a temperature range of sixty to seventy degrees Fahrenheit.

Thus, when the highly heated air strikes the passengers directly, as is the conventional practice, it is too hot and too dry. This gives rise to a situation which is not only uncomfortable, but also unhealthy and although the humidity is raised by evaporation of perspiration and the moisture in respiration, this humidity is lost from the air because the vapor which is concentrated in the warmer stagnant strata precipitates upon the cold windows as the windows chill such air proximate thereto. This not only objectionably removes the moisture from the air as rapidly as it is added by the passengers, but keeps the absolute humidity down to a point only slightly above the low humidity of the cold winter air, and also clouds the windows in a way very undesirable for driving conditions.

Consequently, one of the objects of the invention is to provide a heating system for a motor vehicle which directs the freshly heated current of air into the center of the mass of air in the passenger compartment for moderation before it comes into contact with the passengers.

Another object of the invention is to provide a heating system for a motor vehicle which passes freshly heated air of low humidity directly into the center of the mass of air at the top of the passenger compartment where it commingles with air already moistened by contact with the passengers, thereby creating a uniform absolute humidity and a uniform distribution throughout the compartment.

Another object of the invention is to provide a heating system for motor vehicles which augments convective circulation of air in the passenger compartments in a manner accelerating the downward flow of air proximate the windows, thereby preventing precipitation of moisture on the windows to preserve the acquired humidity and to maintain clear vision through the windows.

Another object of the invention is to provide a heating system for the passenger compartments of a motor vehicle which will heat the compartments uniformly throughout and eliminate cold spots or temperature differentials.

Another object of the invention is to provide a heating device for motor vehicles having a seat dividing the passenger compartment, which draws the air from the bottom of the compartment on one side of the seat and directs it, freshly heated, upwardly from the bottom of the compartment on the other side of the seat where it returns to the first side over the top of the seat to maintain a constant forced circulation throughout the compartment.

Another object of the invention is to provide an improved heating system for a motor vehicle maintaining the acquired humidity of the air in the compartment and replenishing the air by appreciably warmed air without inducing cold or hot drafts and without lowering the absolute humidity.

Another object of the invention is to provide a heating system for a motor vehicle which proportionately removes the air from a passenger compartment at spaced points and reintroduces it to the compartment freshly heated, at a point remote from said other points, to maintain an evenness of circulation throughout the compartment, regardless of the speed of circulation.

Another object of the invention is to provide a heating system for a motor vehicle which circulates the air of the passenger compartment by withdrawing it from the compartment on both sides of a dividing seat therein and reintroduces it upwardly at a point removed from the points of withdrawal to keep all the air constantly in motion.

Another object of the invention is to provide a heating system for motor vehicles which proportions the removal of air from one side of a seat therein and its reintroduction with freshly heated air on the other side of the seat, whereby the vitiated air next to the passengers is constantly being replaced with moderated air.

Another object of the invention is to provide a means for replenishing the passenger compartment of a motor vehicle with warmed air necessarily having low humidity by introducing said replenishing air proximate the in-take of a recirculating system in which it is superheated and forced into the mass of the air before it comes into contact with the passengers.

Another object of the invention is to provide a heating system for the interior of a motor vehicle which prevents stagnation of air at any point and will dispel any stagnation existing immediately when turned on.

Another object of the invention is to provide a heating system which may be readily installed either as original equipment or as an accessory for a motor vehicle to circulate the air in the passenger compartment in an improved manner.

Another object of the invention is to provide a control for a forced circulation heating system for motor vehicles which will automatically operate to stop forced circulation when a door of the motor vehicle is opened.

Another object of the invention is to provide an exhaust pipe furnace which may be readily installed and removed by unskilled persons.

Another object of the invention is to provide an exhaust pipe heat transfer unit made in identical halves with the baffles integrally formed with the jacket members as a single stamping.

Another object of the invention is to provide an improved exhaust pipe furnace and heating system for motor vehicles, which are simple in construction and operation, thoroughly effective in use for the purposes mentioned, and inexpensive to manufacture and use.

These being among the objects of the invention, other and further objects will become apparent from the drawings herein, the description relating thereto, and the appended claims.

Referring now to the drawings:

Fig. 1 is a view partly in side elevation and partly in vertical section illustrating the body of a motor vehicle as equipped with a simple form of the invention;

Fig. 2 is a section taken on the line 2—2 of Fig. 1;

Fig. 3 is a section taken on the line 3—3 of Fig. 1;

Fig. 4 is a section through the heat exchange unit illustrating the preferred embodiment thereof as taken on the line 4—4 of Fig. 1;

Fig. 5 is a section taken on the line 5—5 of Fig. 4;

Fig. 6 is a section taken on the line 6—6 of Fig. 4;

Fig. 7 is a perspective of one of the two identical stampings making up the casing of the preferred embodiment of the heat exchange unit;

Fig. 8 is a perspective of one of the four identical end members employed in supporting and sealing the casing of the heat exchange unit;

Figure 9:
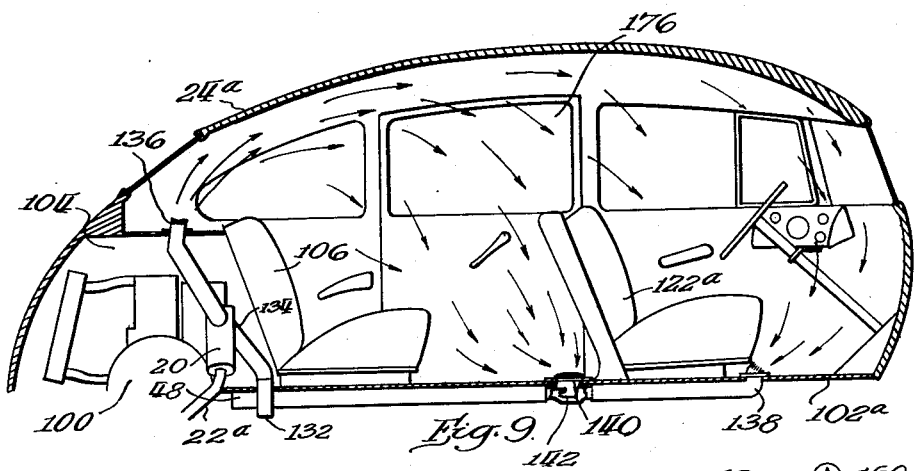
Fig. 9 is a view partly in side elevation and partly in vertical section showing another type of a motor vehicle body as equipped with the invention.

Referring first to the structural details of the preferred embodiment of my heat exchange unit or furnace 20, and to the manner in which it is installed on the exhaust pipes 22 and 22a of the automobile bodies 24 and 24a, as shown in Figs. 1 and 9, respectively, the furnace 20, generally speaking, is constructed of two identical hemi-cylindrical stampings 26 supported on the exhaust pipes and sealed at both ends by flanged half-collars 28.

Each hemi-cylindrical stamping 26 is made preferably of brightly finished sheet metal of low conductivity in order to minimize heat loss through absorptivity and conductivity. As better shown in Fig. 7, the sheet metal blank employed is curved over a major portion 30 thereof to a hemi-cylindrical contour with an integral flange 32 along one edge thereof, bent as along the line 34, to extend inwardly towards the axis of the cylindrical portion and to provide a baffle, by which name the flange 34 will be hereinafter referred to. The ends of the cylindrical portion are crimped or beaded as at 36 to provide shoulders 38 facing each other, and the length of the baffle 32 is appreciably less than the distance between the shoulders 38 so that there is sufficient space between each end of the baffle and the adjacent shoulder to receive the peripheral edge 39 of the collar 28 therebetween in mutually supported relationship.

Proximate the bend line 34, the baffle 32 and the cylindrical portion 30 are fashioned to provide a groove 40 for the reception of the free edge 42 of the other stamping. In this way the cylindrical jacket of the furnace 26 is made by bringing the free edge 42 of each stamping into mating relationship with the groove 40 of the other stamping, and, when this is done around the exhaust pipe 22, the baffles 32 divide the furnace into two compartments 44 and 44a.

The width of the baffles 32 varies throughout their length to provide gradually widening openings 46 connecting the compartments 44 and 44a. These openings are bounded on one side by the wall of the exhaust pipe 22 so that air passing through the openings 46 is forced into direct, heat exchange contact with the exhaust pipe 22. Otherwise, the flow area of the openings 46 is related to the output of the blower 48, which I prefer to employ, so that maximum flow efficiency is obtained throughout the system. In this flow efficiency the wider portions of the openings 46 permit more and more air to flow therethrough with less heat exchange contact per volume as the air forced through the system increases in velocity or volume or both, depending upon the relative capacities of the blower and the openings, in the heater for either volume or velocity, the limits of which can be determined at the time of installation for any particular car.

In order to standardize the production of my furnace and yet preserve its maximum efficiency and universal adaptability for the conventional exhaust pipes of varying sizes and lengths, I design the cylindrical jacket so as to be of a single size, whose outer dimension is capable of providing proper accommodation for the largest of the standard exhaust pipes, and I design the baffles to take care of the smallest of the standard exhaust pipes. The baffles 32 are then scored along lines 50 spaced at proper intervals from the edges 52 and these lines are each appropriately identified by indicia 54 to guide in the severance and removal of sufficient material from the margins of the baffles 32 so that the correct size for the openings 46 can be determined for the best operation of the furnace with exhaust pipes of varying sizes greater than said smallest size, it being appreciated that the marginal material is removed in increasing amounts for the exhaust pipes of increasing sizes.

Moreover, the ends of the cylindrical portions 30 are circumferentially scored along lines 56 to indicate trim lines for shortening the furnace, if the length of exhaust pipe available for the installation is shorter than the length of the stamping. In this way I provide a single article of manufacture standardized for all standard exhaust pipes, which when used in pairs, forms the cylindrical jacket of the furnace 26.

In addition to the identical structural characteristics already described, the stampings are each provided with apertures as at 60 in which tubular conduits 62 are received, flanged and swaged securely in place as at 64 and 66 respectively. With this construction, the conduit in one of the stampings serves as an inlet 68 and the conduit in the other stamping serves as an outlet 68a for the compartments 44 and 44a, respectively. The conduits are located proximate the end of the stampings where the baffles 32 are the widest, so that the narrow portion of the openings 46 is located at the inlet and outlet ends of the casing. This prevents a quick flow of air from one compartment to the other directly between the conduits, and thereby distributes the flow throughout the length of the openings, so that the air forced through the furnace will come into contact with the surfaces of the exhaust pipe in heat exchange relationship with as great an effectiveness as possible.

The flanged half-collars 28, already mentioned, for sealing and supporting the cylindrical jacket on the exhaust pipe, are four in number for each installation, and are identically constructed. Each collar, as better shown in Fig. 8, comprises a hemi-cylindrical flange 70 for engaging the face of the exhaust pipe 22, and stamped integrally therewith, is a radially extending flange 72 with an over-lap portion 74 at one end. The outer edge 39 of the radial flange 72 has the same diametral dimension as the cylindrical jacket while the dimensions of the flanges 70 may be of different sizes for different exhaust pipes, or provided with inserts (not shown) to accommodate the various exhaust pipes upon which the unit might be installed.

When installing the furnace, the four half-collars 28 are secured to the exhaust pipe 22 with the flanges 70 extending towards each other. One pair of half-collars is secured to the exhaust pipe by a clamp 76 surrounding the flanges, with both of the over-lap portions 74 placed preferably upon the inner side of the radial flanges so as to urge a tight seal between the flanges 72 by the tension developed from a crossing of their respective radial planes. The clamps 76 are tightened down by a nut and screw assembly 78 until the first pair of half-collars is rigid with the exhaust pipe, it being preferred that the overlaps be disposed in a horizontal line for a reason to be explained later.

A stamping 26 is next brought to hand to measure the distance at which the other pair of half-collars is to be secured to the exhaust pipe. When this point is determined, the other pair of half-collars 28 is tightened in place like the first pair, so that the periphery 46 provided by each pair of end members comes between the crimped flanges 36 and the end of the baffles 32 on the stampings. The cylindrical stampings are then disposed in place with the conduits 62 extending in a horizontal direction with the edge 42 and groove 40 joints lying in a vertical plane. Band clamps 80 are then employed to draw the edges 42 and grooves 40 into tight relationship and the crimped ends 36 inwardly against the peripheral edges 39 of the half-collars, so that the assembly is held securely in place. With the overlaps 74 disposed horizontally, there will be no interference between the overlap joints and the edge and groove joints just mentioned.

Thereafter the whole assembly is covered with a coat of asbestos paste 82. The ends of the paste covered assembly are reinforced by radially slit asbestos disks 84 pressed against the ends with the edges 86 thereof drawn to the cylindrical contour of the outer face of the coating. Thereafter, the outer face of the coating is wrapped with asbestos tape 88 spirally back and forth several times to strengthen and thicken the covering, and to assure against leakage of air from the furnace. The end portions of the conduits 62 are left exposed for the reception of conduit tubing 90 thereon.

From the description thus far, it will be appreciated that the heat exchange unit of my invention can be constructed simply from very inexpensive parts and has a universal application to exhaust pipes of different sizes. The unit can be assembled quite readily even by persons unskilled to such tasks and when completed provides an insulated member assuring the highest degree of heat exchange sealed against escape of air from the system. Moreover, danger of monoxide gas entering the system is minimized, since the heat of the exhaust gases is utilized without need for cutting or breaking the exhaust pipe.

Referring now to my heating system of which the furnace 20 just described is a part, and how it is used with two representative body designs of two different motor vehicles, the body 24 shown in Fig. 1 is a four-door sedan designed for motor vehicles having the motor 100 in front and the exhaust pipe 22 extending rearwardly under the floor 102, and the body 24a shown in Fig. 9 is a sedan designed for motor vehicles having the motor 100 located in a rear compartment 104 behind the rear seat 106 with the exhaust pipe indicated at 22a.

With the advent of streamlined hood designs and the development of many of the engine accessories which are now standard equipment, the exhaust pipe 22 has little, if any, space around it for any appreciable length until after it curves as at 108 down and under the toe board 110. Between this point and the muffler 112 there is generally a straight portion 114 long enough to receive the furnace 20 between the cross members of the X-frame (not shown) conventionally used for the chassis of the motor vehicle.

I prefer to install my furnace 20 on this straight portion 114 of the exhaust pipe 22 in a motor vehicle where the motor is in front, and although it will be appreciated that the unit 20 can be installed elsewhere with suitable adaptation of my heating system, I prefer to use the motor driven air blower 48 whose inlet 116 is conformed to provide a grill and a fastening bracket 120 for installation in the floor 102 immediately in front of the front seat 122. This provides a construction which can be easily installed and removed for cleaning, servicing and other purposes intended, and the exhaust port 124 of the blower 48 is connected to the inlet 60 conduit 68 of the furnace 20 by a flexible fabric conduit 90 held in shape by a spirally wound wire 126 disposed in it and extending throughout its length. The outlet conduit 68a of the furnace 20 is connected to a nozzle bracket 128 placed in the floor 102 immediately behind the front seat 122 where it directs the heated air upwardly to the top of the passenger compartment.

With this installation, when the blower is turned on, there is a continuous circulation of freshly heated air in which the currents are generated as indicated by the arrows 130 in Figs. 1, 2 and 3. The circulation of the air is complete and continuous with the freshly heated air forced directly into the center of the mass of the air in the compartment where it commingles and is mixed with air already there, whereby the air is moderated before coming into contact with the passengers. No convective stratification of the air is permitted and therefore the effective temperature for the passengers is not biased or unbalanced by a warm stratification of air around the head and shoulders to give a false feeling of warmth.

In addition to heat moderation, the freshly heated air, as directed to the center of the mass, is also moderated as regards humidity, by the moisture constantly being supplied to the mass by absorption from the passengers themselves. Moisture is given off by the passengers at a rate somewhat inversely proportional to the humidity of the air and the passengers themselves thereby become humidifying agents for the air they contact. The less the relative humidity is, the more readily moisture is absorbed, and it remains only to conserve such acquired vapor content against depletion to render the air more comfortable for the passengers.

In conserving the acquired humidity in a passenger compartment, it is appreciated that, aside from actual air loss from the car, the main problem is to prevent precipitation of the moisture upon the windows. When the moisture-laden air next to the windows is in constant forced circulation, there is little opportunity for any portion thereof to become chilled below its dew point during the brief time it is in radiating contact with the window. Consequently, it will be appreciated that the speed of circulation I intend for the system is such that under extreme cold conditions, the blower I employ for any given compartment will be designed and provided with sufficient velocity to overcome any danger of a dew point being reached while the air is in contact with the windows. This prevents the precipitation which removes the moisture from the air.

In this way I provide a heating system for motor vehicle bodies which provides a continuous circulation of air on both sides of a seat by the use of a single heater and a single air forcing means. The passengers are warmed with moderated air, kept in a constant motion sufficient to give uniformity in temperature and humidity without objectionable drafts, and the windows are kept clear, the added advantage also being present that the acquired humidity of the air is conserved for the comfort of the passengers.

Moreover, it will be appreciated, that the removal of vitiated air from the floor not only augments convective circulation but, with the vitiated air being heated to a high intensity in the heat unit, the rapid increase of heat content induced will tend to purify the stale air of impurities and odors.

Referring now to Fig. 9, I have shown my heating system as installed with the representative car having its engine 100 in a rear compartment 104. The unit is installed on the exhaust pipe 22a, or in event the exhaust pipe is not placed where it can be readily available, the heater may be adapted for installation on the muffler, which in some ways is an advantage in that the heat exchange area is greatly increased. The blower is shown at 132 and forces air into the furnace 20 at 134, upwardly through the top of the engine compartment 104 into the passenger compartment through a nozzle 136 which directs the heated air along the top of the car, forward and down past the windows. Two intakes for removing the stale air, are provided in the floor 102a, one, 138, being located in front of the front seat 122a and the other, 140, being located immediately behind the front seat.

In this particular installation, I intend that air circulation speeds may be varied by varying the speed of the blower without changing the proportional flow of the air into both intakes. I accomplish this by a Venturi nozzle 142 located in the rear intake 140 so that the amount of air coming from the compartment in rear of the front seat will operate to proportion the amount of air drawn from in front of the front seat. In this way, regardless of the speeds at which the air is circulated, the circulation factors will remain constant and there will be no tendency for the air currents to follow shorter paths as the speed of circulation is reduced either automatically or by hand, see the rheostat switch 144, in Fig. 13.

Figure 10:
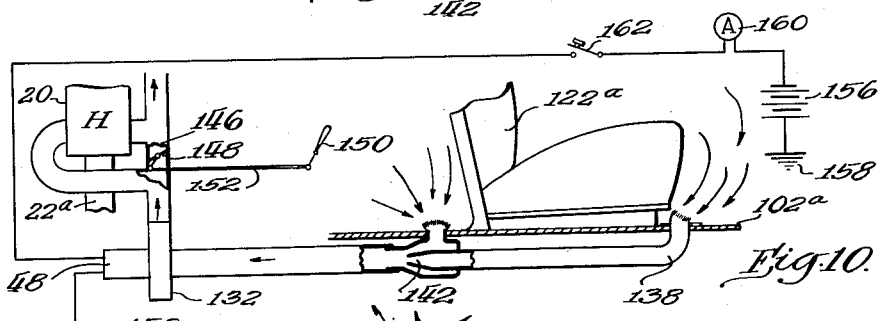
Fig. 10 is a diagrammatical illustration of one form of the invention.

Referring to Fig. 10, I illustrate a system similar to the one shown in Fig. 9, in which a by-pass 146 is provided for the air around the furnace 20. The by-pass is adjustable to vary at will the amount of air passing through the furnace 20. In the embodiment shown, a butterfly valve 148 is employed in the by-pass 146 and is controlled by the handle 150 which may be located any place in the car. The handle may be operated manually or thermostatically to actuate and control the valve by means of a Bowden cable such as indicated at 152 or by any other means appropriate for the purpose. With this embodiment, the heat content of the incoming freshly heated air can be changed as required for comfort without reducing the speed of the circulation. In this way, whether the gradually widening openings 46 are relied upon or the venturi action just described, or both, it is possible with the present invention to increase the air circulation in the riding compartment without increasing the supply of heat thereto. Thus, the velocity of circulated air can be increased effectively without discomfort to combat those factors which are increasingly conducive to stratification. Such an increase in velocity is important with respect to the period of time the air is in contact with windows since the dew point rises at the compartment becomes warmer.

Furthermore, in the embodiment just discussed, one form of electrical control is shown wherein the battery is illustrated at 156 with one pole connected to the ground 158 and the other connected to the ammeter 160, through the heater switch 162, then to the blower motor 48 and from there to the ground 158 to complete the circuit control.

Figure 11:
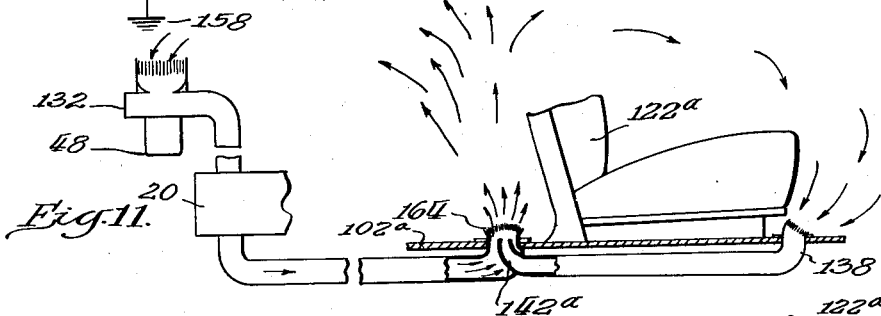
Fig. 11 is a diagrammatical illustration of another installation of the invention.

Referring to Fig. 11, I illustrate a system of circulation which operates to circulate the air on both sides of the front seat in a manner similar to the system shown in Fig. 1. Herein the air is drawn in behind the rear seat and forced upwardly into the compartment, freshly heated, from a nozzle 164 located immediately behind the front seat. A venturi action 142a is employed to withdraw air from in front of the front seat 122a and into the nozzle 164 where it commingles with the freshly heated air and is driven to the top of the car also in a proportion independent of speed of circulation. This particular construction affords an increased circulating capacity for the system by adding the Venturi circulation to that of the circulation provided by the blower. In this way the quantity of air circulated is not limited to the capacity of the blower. This is accomplished because the venturi does not feed into the intake of the blower but is subjected to and driven by the exhaust of the blower.

Figure 12:
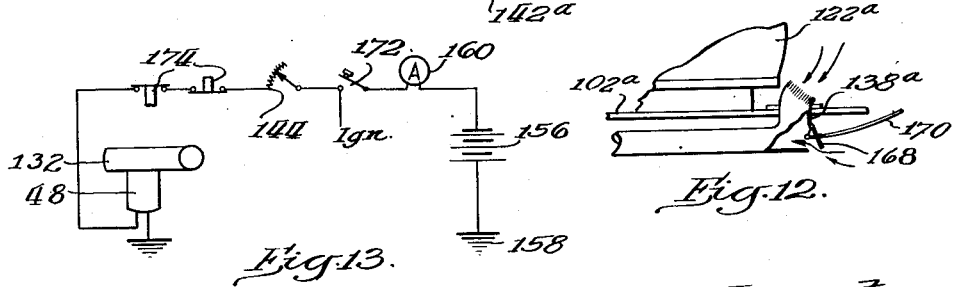
Fig. 12 is a side elevation partly in section of a means for supplying fresh air to the heating system.

Referring now to Fig. 12, a valve 168 operable by a Bowden cable 170 is provided which can be used with any of the systems illustrated in Figs. 9, 10 and 11, to replenish the air in the system, either manually or automatically, with air from the outside. In event the valve is used with the system in Figs. 9 and 10, the fresh air is part of that which is freshly heated before it reaches the compartment. In event the valve is employed with the system shown in Fig. 11, the fresh air commingles with the freshly heated air before it is forced upwardly into the compartment, thereby providing a moderating effect which may be an advantage if upon occasion it would be found desirable with any particular installation to provide means for quickly lowering or regulating the temperature of the passenger compartment.

Figure 13:
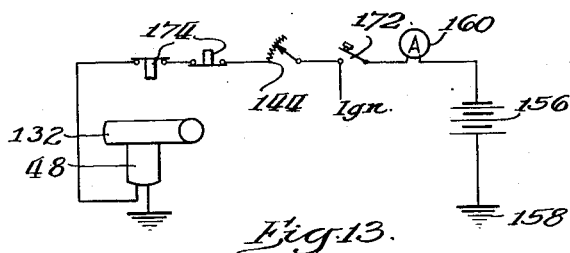
Fig. 13 is a diagrammatical illustration of an electrical control for the heating system.

The electrical circuit illustrated in Fig. 13 illustrates a preferred control for the system wherein the blower is controlled by a plurality of different switches, one the ignition switch 172, another the rheostat switch 144, and the contact switches 174 that are controlled by the doors 176 of the vehicle, the switches 174 breaking when any one of the doors is opened, thereby turning the blower off as long as one or more doors remain open so that the forced circulation induced by the blower will not exhaust the air inside the passenger car through the open doors. With the closing of all doors, the blower will commence automatically to again heat and moderate the air in the compartment, as already described.

Consequently, although several preferred embodiments of the invention have been shown and described herein, it will be apparent to those skilled in the art that various and further uses, modifications and changes may be made without departing from the spirit and substance of the invention, the sketch of which is commensurate with the appended claims.

What is claimed, is:

1. In a motor vehicle having compartments separated by a seat, a heating system comprising, a heat transfer unit including means for automatically increasing the inverse heat exchange proportions existing between the flow of varying quantities of air over a given heated surface, means for forcing varying quantities of air through said unit, the intake for said means being located on one side of said seat, and the exhaust for said means being located on the other side of said seat.

2. In a motor vehicle having riding compartments separated by a seat, a heating and air circulating system comprising, a heat exchange unit having a graduated opening between the housing and the heat element, means for forcing air through said unit, a conduit interconnecting the compartments on both sides of the seat, an inlet port for said unit adjacent the narrow portion of said opening, an exhaust port for said unit, said ports being located at spaced points on opposite sides of said opening and said conduit being connected to one of said ports whereby circulation of air through said conduit is induced by said forcing means, and means for supplying said conduit with fresh air from outside said compartments.

3. The method of air conditioning an occupied compartment comprising, progressively confining a portion of air in said compartment, moving said portion into heat exchange relationship with a heated element varying the heat exchange relationship more than inversely proportional to the velocity with which said portion is moved, returning said portion to said compartment through a predetermined orifice, and subjecting another portion of air to the flow of said first portion under a venturi action whereby said second portion of air is moved simultaneously and proportionately with the movement of said first portion of air in direct relationship therewith.

4. In a motor vehicle having a compartment, a heating system comprising a heat transfer unit including a graduated opening disposed between the inlet and outlet of the unit with the greatest width remote from the inlet and outlet for passing increasing amounts of air through the opening with less than a proportional heat exchange relationship upon an increased flow of air through the opening, intake and outlet passageways connecting the unit with the compartment, and means for forcing varying amounts of air through the unit.

5. In a motor vehicle having a riding compartment with windows, the method of providing a substantially even temperature in the compartment comprising progressively confining and forcing a portion of the air in the compartment towards the ceiling of the compartment in varying quantities and at varying velocities, progressively providing said portion with more than proportionately decreased heat units per volume of air at increased velocities, and increasing the quantity and velocity of said air portion inside the compartment with the increase of the temperature therein.

6. In a motor vehicle having a riding compartment with windows, the method of providing a substantially even temperature throughout the compartment comprising progressively confining and forcing a portion of the air in the compartment through the remaining body of the air in the compartment towards the ceiling of the compartment in varying quantities and at varying velocities, progressively heating said portion by adding more than proportionately increased quantities of air per unit of heat at the higher velocities, and generating with said portion a turbulence in said compartment increasing with the temperature in the compartment.

7. In a vehicle having a riding compartment with windows, the method of circulating air in said compartment comprising progressively forcing at a variable velocity a portion of the air in the compartment through a heat exchange unit and directing the air upwardly toward the top of the compartment and downwardly over the windows at velocities sufficient to move the air across the windows before any part thereof contacting the windows is chilled to the dew point, retaining the required humidity of the air thereby and adding heat units to said air in more than proportionately decreased amounts with increases in said velocity.

8. In a motor vehicle having a riding compartment, a heating and air circulating system comprising a heat exchange unit, means for forcing air through said unit, conduit means interconnecting two spaced openings in said compartment, one of said openings comprising an intake opening in the compartment in direct communication with said forcing means, an exhaust conduit for said forcing means communicating with an exhaust opening constructed and arranged for directing air supplied to it upwardly against the top of the riding compartment, said conduit means including a port opening in a direction downstream to the flow of air through the conduit means and the other of said openings being connected to said port in said conduit means to be subjected to asperations induced by the flow of air created by said forcing means and the circulation in said exhaust conduit augmenting the circulation in said compartment to vary the heat content per volume of air circulated by increased amounts of tempering air from the compartment.

9. In a motor vehicle having compartments separated by a seat, a heating system comprising a heat transfer unit, means for forcing air through said unit, intakes for said means located on both sides of said seat, means for proportioning as between the intakes the amount of air received by said unit from said intakes throughout the speed range of said air forcing means, an exhaust for said means opening upwardly into the body of air present in the compartment and located in said compartment for continuous circulation of air.

10. In a motor vehicle having riding compartments separated by a seat, a heating and air circulating system comprising a heat exchange unit supplied with waste heat from the motor, a motor driven fan for circulating air in heat exchange relationship with said unit, means for withdrawing air from the compartments to said fan and unit and means connected with said fan and unit to return the air to the compartments, said air withdrawing means comprising a pair of ports opening adjacent the floor upon opposite sides of the seat in continuous and open communication with the fan, means for proportioning the flow of air through said pair of ports throughout the range of fan speeds for moving the air in proportioned amounts upon opposite sides of the seat during all speeds at which the fan is operated.

11. In a motor vehicle having windowed riding compartments separated by a seat, a heating and air circulating system comprising a heat exchange unit providing more than proportionately decreased heat unit content in given quantities of air upon increased velocity of circulation and means for forcing air through said unit at a speed sufficient to move the air in the riding compartments across the windows before the air contacting the windows within a given thermal content is chilled to the dew point, a conduit connecting the compartments on both sides of the seat, an inlet port for said unit, and an exhaust port for said unit connected with said unit, said conduit at one end being connected to one of said ports, said ports being located at spaced points to supply to one compartment air tempered by mixture with air in the other compartment conducted through the conduit, the movement of air through said one of said ports inducing movement of air through said conduit.

12. The method of air conditioning an occupied compartment comprising, progressively confining a portion of air in said compartment under forced draft, moving said portion into heat exchange relationship with a heated element, returning said portion to said compartment through a predetermined opening, subjecting another portion of air to the flow of said portion under Venturi action and varying more than inversely proportional the relationship between the heat content of said portions and the velocity at which the portions are moved.

13. In a motor vehicle having a riding compartment, a heating and air circulating system comprising a heat exchange unit, means for forcing air through said unit, conduit means interconnecting two spaced openings in said compartment, an intake opening in the compartment for said forcing means, and an upwardly opening exhaust conduit contiguous with one of the spaced openings for said unit for forcing a column of air through said one of said spaced openings upwardly penetrating to the top of the compartment whereby flow of air through said conduit means is induced by the flow of air through said exhaust conduit and through said opening common to both said conduits to vary the heat contents per volume of air by increased amounts of tempered air from the compartment.

14. In a motor vehicle having a riding compartment divided by a seat into a plurality of portions for occupancy and air sealed from the engine compartment, a heating system comprising a heat transfer unit, means for forcing air through said unit, intakes for said means located on both sides of said seat, an exhaust opening for said means opening upwardly at the floor into the body of air in the riding compartment at a point located remote from said intakes to force a column of air upwardly toward the top of said riding compartment through the body of air therein to turbulate same.

15. In a motor vehicle having a compartment divided by a seat, a heating system comprising a quickly warmed heater unit having intake and outlet conduits connecting the unit with the compartment, means for forcing varying amounts of air through the unit, and means for varying inversely the heat units added to the air by the heater unit to the compartment in relation to the degree of turbulence created in the compartment, said forcing means including one of said conduits and an opening directing a column of air upwardly against the top of the compartment, and means for supplying air to the conduit independently of the heater itself.

16. In a motor vehicle having a riding compartment with a seat therein, a heating system comprising a heater unit having intake and outlet conduits connecting the unit with the compartment, manually controlled means for forcing air through said conduits and unit, means for automatically varying inversely the relationship between the amount of heat transferred to said air and the degree of turbulence created in the compartment by said forcing means, said forcing means including a device receiving air from the heater and directing same upwardly from the floor against the top of the compartment, and means for supplying at will fresh air to the compartment through one of said conduits.

17. In a motor vehicle having a compartment divided by a seat, a heating system comprising a heat transfer unit for heating the compartment, intake and outlet conduits connecting the unit with the compartment, means for forcing varying amounts of air through the unit, conduit means for conveying and mixing air adjacent the bottom of the compartment with air warmed by the heater, and means for directing said mixed air upwardly in the compartment to turbulate the air in the compartment, and means for varying inversely the relationship between the transfer of heat units by the heat transfer unit to the air passing through said unit and the degree of turbulence existing in said compartment.

MARVIN C. BROOKS.